United States Patent
Bhatnagar et al.

(10) Patent No.: US 9,741,033 B2
(45) Date of Patent: *Aug. 22, 2017

(54) SYSTEM AND METHOD FOR POINT OF SALE PAYMENT DATA CREDENTIALS MANAGEMENT USING OUT-OF-BAND AUTHENTICATION

(71) Applicants: Piyush Bhatnagar, Morganville, NJ (US); Andrew Ferreira, Holmdel, NJ (US)

(72) Inventors: Piyush Bhatnagar, Morganville, NJ (US); Andrew Ferreira, Holmdel, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/193,088

(22) Filed: Jun. 26, 2016

(65) Prior Publication Data

US 2016/0307194 A1    Oct. 20, 2016

Related U.S. Application Data

(63) Continuation-in-part of application No. 14/143,659, filed on Dec. 30, 2013, now Pat. No. 9,412,283.

(Continued)

(51) Int. Cl.
*H04L 29/06* (2006.01)
*G06Q 20/38* (2012.01)
(Continued)

(52) U.S. Cl.
CPC ... *G06Q 20/38215* (2013.01); *G06Q 20/3829* (2013.01); *G09C 5/00* (2013.01);
(Continued)

(58) Field of Classification Search
CPC .......... G06Q 20/38215; G06Q 20/3829; H04L 63/0428; H04L 63/06; H04L 63/08; H04L 63/18; H04L 9/3215; H04L 9/3228
See application file for complete search history.

(56) References Cited

U.S. PATENT DOCUMENTS

| 8,256,664 B1* | 9/2012 | Balfanz | G06F 21/43 235/375 |
| 2013/0167208 A1* | 6/2013 | Shi | H04L 63/18 726/5 |

(Continued)

*Primary Examiner* — Izunna Okeke
*Assistant Examiner* — Hee Song
(74) *Attorney, Agent, or Firm* — Douglas C. Wyatt

(57) ABSTRACT

The invention provides an easy to use credential management mechanism for multi-factor out-of-band multi-channel authentication process to protect payment credentials without the risk of malware and skimming attacks. When opened, the secure payment application generates a multi-dimensional transitory key. The user authenticates the multi-dimensional transitory key and validates the secure payment application, triggering an out-of-band outbound mechanism. The portable mobile device invokes the authentication server and the authentication server authenticates the user based on the authenticated transitory key. After authentication, the merchant is allowed access to the payment credentials to complete the transaction. The process of the invention includes an authentication server, a secure payment application to generate an authentication vehicle or an embodiment (i.e. multi-dimensional transitory key) and handle incoming requests, and a portable communication device with a smartphone application.

20 Claims, 12 Drawing Sheets

Related U.S. Application Data

(60) Provisional application No. 61/747,517, filed on Dec. 31, 2012.

(51) Int. Cl.
*H04W 12/04* (2009.01)
*H04W 12/06* (2009.01)
*G09C 5/00* (2006.01)
*H04L 9/32* (2006.01)
*H04L 9/08* (2006.01)

(52) U.S. Cl.
CPC .......... *H04L 9/3215* (2013.01); *H04L 9/3228* (2013.01); *H04L 63/0838* (2013.01); *H04L 63/0853* (2013.01); *H04L 63/18* (2013.01); *H04W 12/04* (2013.01); *H04W 12/06* (2013.01); *G06Q 2220/00* (2013.01); *H04L 9/0872* (2013.01); *H04L 63/0428* (2013.01); *H04L 63/06* (2013.01); *H04L 63/083* (2013.01); *H04L 2209/56* (2013.01); *H04L 2209/80* (2013.01)

(56) References Cited

U.S. PATENT DOCUMENTS

| | | | |
|---|---|---|---|
| 2013/0173915 A1* | 7/2013 | Haulund | H04L 9/3226 713/159 |
| 2014/0096220 A1* | 4/2014 | Da Cruz Pinto | G06F 21/00 726/9 |

* cited by examiner

SYSTEM AND METHOD FOR POINT OF SALE PAYMENT DATA CREDENTIALS MANAGEMENT USING OUT-OF-BAND AUTHENTICATION

PRIORITY

This application is a continuation-in-part of co-pending U.S. patent application Ser. No. 14/143,659 filed on Dec. 30, 2013, which claims priority to U.S. Provisional Application Ser. No. 61/747,517 dated Dec. 31, 2012, the contents of which are all relied upon and incorporated herein by reference.

INCORPORATION BY REFERENCE

Applicant incorporates by reference herein United States publication no. 2012-0240204-A1, entitled "System, Design and Process for Strong Authentication using Bidirectional OTP and Out-of-Band Multichannel Authentication."

FIELD OF THE INVENTION

The field of invention relates to network and credit card data security. The present invention relates to an authentication system and authentication method and in particular to a process and design for a multi-factor, out-of-band multi-channel authentication process to protect all credit card data or other data objects.

BACKGROUND OF THE INVENTION

Authentication of a user and his credentials is the first line of defense. User authentication involves confirming the identity of a user and validating that a user is trusted and can use an electronic resource based on his credentials.

ID's can be lost or stolen during transactions (whether during login, payment, or other transactions), and ID's must be presented in many places explicitly. For example, in the process of electronic payment, one's credit card details must be presented to a counter party. Although an ID in a transaction may be encrypted, there are still many possibilities that an ID can be lost or stolen.

Static or fixed password is a common form of authentication method in use today. In the static password authentication method, the user enters static user ID and password on a client site and submits them. Then the request is sent to the authentication server to validate the credentials of the user. If the credentials are valid the user is transferred to the next page.

Point of Sales (POS) technology has been around for many years starting with the cash register in the late 1800s and early 1900s. With the advent of better computing capabilities, Internet and connected systems, in the 1970s and 1980s, POS was modernized to leverage advancing technology. Today, the modern, connected POS can be found everywhere and is now an integral part of the modern world.

A typical transaction with POS starts with the consumer swiping his credit card at a POS terminal at the merchant retailer's location. The merchant's system sends the swiped card data to the merchant's bank, which then sends the card data to the payment brand. The payment brand sends this data to the cardholder's bank, which checks the card details to verify the validity of the card. If everything matches, the cardholder's bank will send an authorization code to the payment brand who then forwards the code to the merchant's bank. The authorization code allows the merchant to complete the sale.

In recent times, many retail organizations have been victims of security breaches that target consumer payment card data. There are several examples within retail as well as within hospitality and healthcare locations. Many of these attacks have been orchestrated against the Point of Sales systems. The most recent one being the PoSeidon malware attacks. Given the recent spate of news on the POS vulnerabilities and attacks, many companies are looking for better solutions and improved defenses.

An object of the present invention is to provide an authentication system, authentication method, and key distribution method which permit improvement in the security of payment data and distribution process while making it easier to use than existing methods. The invention utilizes bi-directional, asynchronous, out-of-band authentication.

SUMMARY OF THE INVENTION

The instant invention provides an easy to use authentication and credential management mechanism for multi-factor out-of-band multi-channel authentication process to protect payment data. This invention provides a strong method for retail, hospitality, healthcare merchants to protect the payment data they deliver to others. This system authenticates access to the payment data based on an out-of-band authentication mechanism.

The authentication seeker or system user scans the multi-dimensional barcode or via other embodiments, such as Bluetooth, NFC, computer generated sound, TOTP, face capture, etc., validates the client, and triggers the out-of-band outbound mechanism. The portable mobile device invokes the client server for authentication. The client server authenticates the user based on a shared secret key and facilitates the transmission of the relevant payment credential password, permissions, and/or other credentials to the credit card data tool, which then unlocks the payment data.

This invention protects the users from malware attacks, card skimmers, and hackers, as well as a multitude of attacks against the uncontrolled storage of the payment data in memory, in transit, and at rest.

The system of the invention includes: a POS Data Application, comprising either a single application incorporating this invention, or two applications, one for manipulating payment data, and a second one for creating a connector between the POS application, the authentication server, and the authentication server application. The authentication server application communicates with the client device and the POS Application (e.g. multi-dimensional barcode, TOTP, or SSL), handling incoming requests, secret keys, and a portable communication device with an online application.

A preferred embodiment of the present invention utilizes a client/server system, which comprises an authentication server, a Secure POS Application, and a user hand held mobile device equipped with a camera or reader, all of which are connected via a network. The Secure POS Application and the authentication server achieve mutual secure connection based on secure sockets layer (SSL). The handheld device is also connected to a network and can connect to the authentication server in a secure manner using SSL.

In an embodiment, a retail merchant who wants to access a consumer's credit card data using this invention opens the Secure POS Application on the POS Terminal. This application detects that the merchant requires user credentials and generates a multi-dimensional dynamic barcode, or invokes another transmission mechanism, such as Bluetooth, NFC, or computer generated sound, based on the online service client/server information including, but not limited to a payment credential identifier, a dynamically generated key, and a unique session ID. These credentials are then presented to the user.

The Secure POS Application, at that point, contacts the authentication server and informs it that the Secure POS application is waiting for user credentials for this specific transaction with a specified session ID. The user starts the online application on the hand-held device that includes the authentication client application and camera. The user provides its authentication information, such as a PIN or Gesture, and/or additional biometric signatures, such as face match, voice print match, etc.

The handheld device then establishes an independent secure connection over a carrier network wireless connection or Wi-Fi connection to the authentication server using SSL. The online application validates the user PIN/Gesture, as well as the biometric profile, with the authentication server. The online application on the hand held device decrypts/decodes the barcode and ensures the validity of the request. This unique client validation mechanism ensures there are no malware or skimming attacks.

Once the validity of the Secure POS application is ensured, the online application takes the extracted data from the bar code, looks up the password of the credit card in a secure credentials database by extracting the credit card identifier from the request. If the credentials for that secure credit card are not found in the secure credentials database, the online application presents a screen to the user to provide the credentials for that login portal. Once the user provides the credentials, the online application saves the credentials on the secure credentials database on the hand held device for future use.

The online application then sends user credentials for the credit card along with the unique session ID to the authentication server directly using this secure out-of-band channel. If the authentication server finds the user and the session ID valid, it contacts the waiting Secure POS Application using the session ID and passes the user credentials, as well as user roles/privileges. Based on the user roles/privileges, the Secure POS Application can automatically provide specified access to the allowed service components for which the user has been authorized.

In this embodiment, the user experience is simplified and only requires the user scanning the barcode presented on the screen or just be in close proximity to the computer in the case of using NFC, Bluetooth, or computer generated sound. From the user's perspective, once the scanning of the barcode is done, if the user credentials are valid, the process of accessing the credit card data proceeds based on the user rights.

By utilizing the multi-dimension bar code, NFC, Bluetooth, Audio, TOTP, or face capture, the invention, as described herein, improves usability and eliminates key security issues.

The method, according to the invention, uses shared keys protected with each recipient's dynamic encrypted key (e.g from a public/private key pair) distributed via a central point to a key store on a personal device, such as a smartphone. The device communicates with various payment credentials rendering and manipulation tools via the aforementioned QR code, Bluetooth, NFC, Audio, TOTP, or face capture and out-of-band communications to decrypt the payment data on demand. This method also provides for partial or total payment data invalidation after completion of transaction.

It is to be understood that both the foregoing description and the following description are exemplary and explanatory only and are not restrictive of the invention, as claimed. Specific examples are included in the following description for purposes of clarity, but various details can be changed within the scope of the present invention.

BRIEF DESCRIPTION OF THE DRAWING

A preferred embodiment of the invention has been chosen for detailed description to enable those having ordinary skill in the art to which the invention appertains to readily understand how to construct and use the invention and is shown in the accompanying drawing in which.

DETAILED DESCRIPTION OF THE INVENTION

Figure 1:
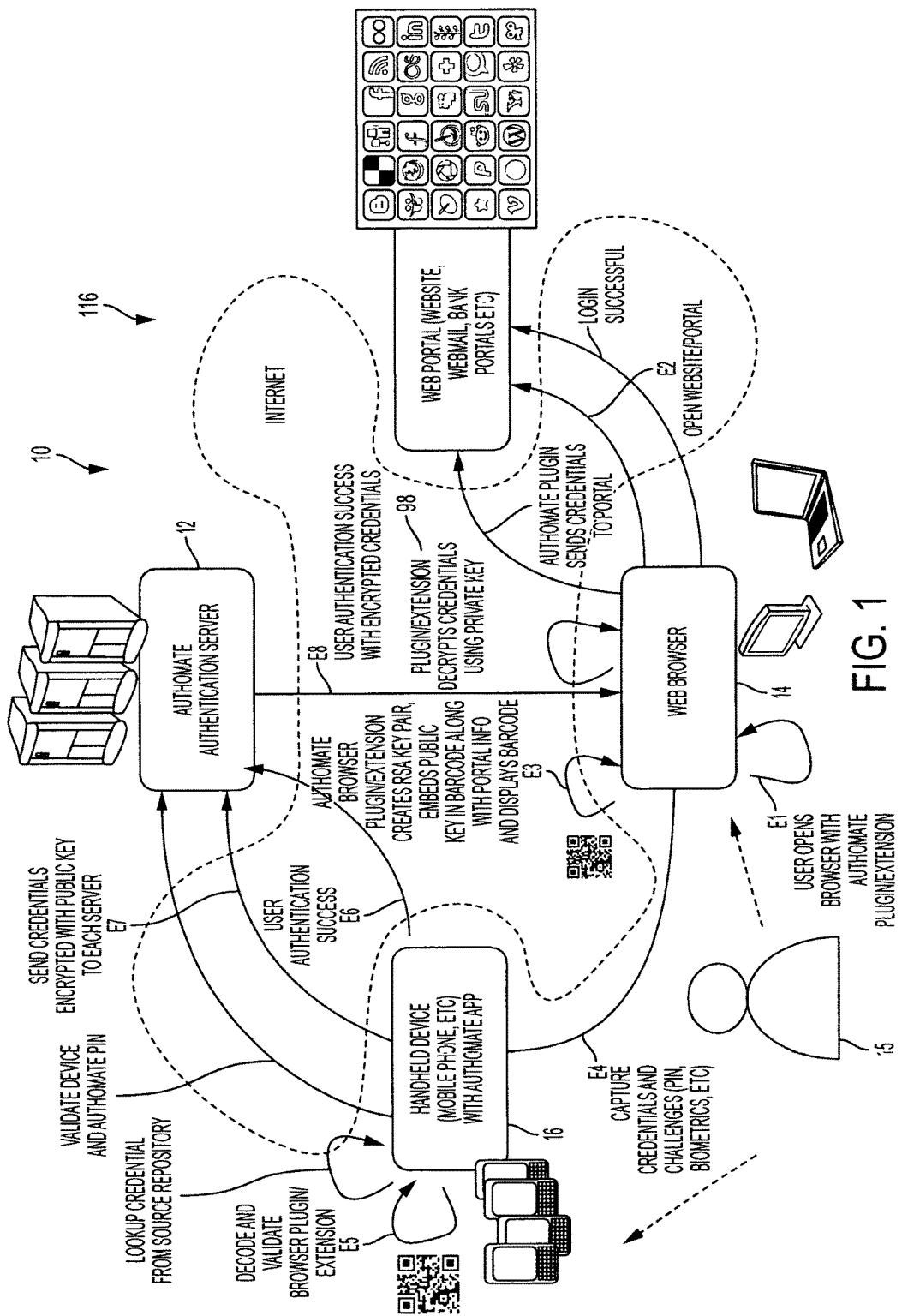
FIG. 1 is a block diagram describing the various components of an embodiment invention and depicting an example of an out-of-band outbound multi-channel authentication.

Referring to the drawing, FIG. 1 illustrates an embodiment of a system and process according to the invention. In particular, FIG. 1 shows an authentication system 10 that utilizes out-of-band outbound multi-channel authentication using a client/server system comprising an authentication server 12, browser having client processing 14, such as plug-ins or extensions, and a user hand held mobile device 16 equipped with a camera and with online authentication client, all of which are connected via a communications network 116 to access an online account server.

The browser plug-in and the authentication server can achieve mutual secure connection, based on a connection such as Secure Sockets Layer (SSL). The handheld device is also connected to the network and can connect to the authentication server in a secure manner using a connection such as SSL.

Figure 6:
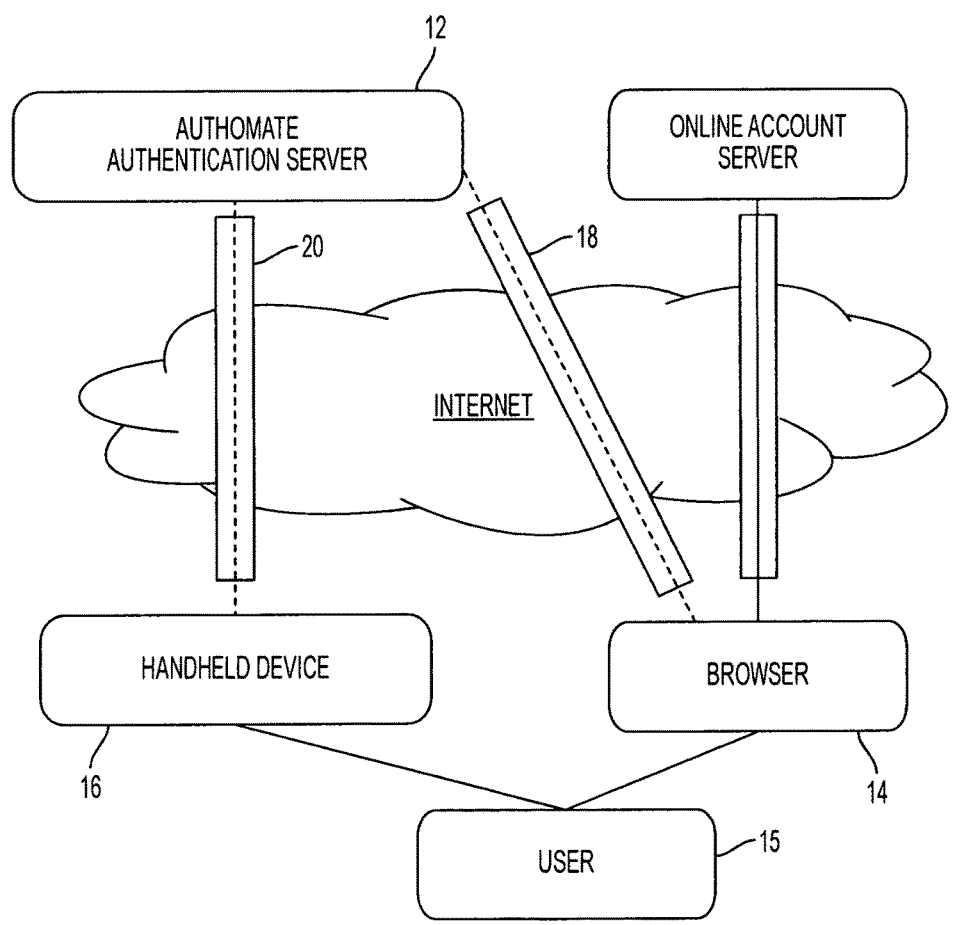
FIG. 6 is a block diagram illustrating one example of two separate communication channels in an embodiment of the present invention.

FIG. 6 illustrates one example of the two separate communication channels in the present invention that are used for the authentication process. The handheld device 16 communicates with the authentication server 12 over a first communications channel 18 which is separate from a second communications channel 20 over which the browser having the client processing application 14 and authentication server 12 communicate. In one embodiment of a system and process according to the invention, at least the out-bound portions of communications from the handheld device to the authentication server are provided in a separate communications channel 18 and are out-of-band from the communication channel 20 over which the authentication server 12 and client processing application 14 communicate.

The authentication server 12 compares the user information and the third party server credentials to a database of user information and a database of third party server credentials. The authentication server 12 authenticates the user information and the third party server credentials to obtain authentication results. The authentication server 12 transmits E1 the authentication results to the client processing application 14 and can also transmit E2 the authentication results to the portable communications device 16. The client processing application 14 also transmits E3 the authentication results to the hand held device 16. If the authentication results are positive, a secure communication may be established between the user and the client processing application 14, and the user 15 may be granted access by the client processing application 14. Alternatively, if the authentication results are negative, the user is denied further access to the client processing application 14.

Figure 2:
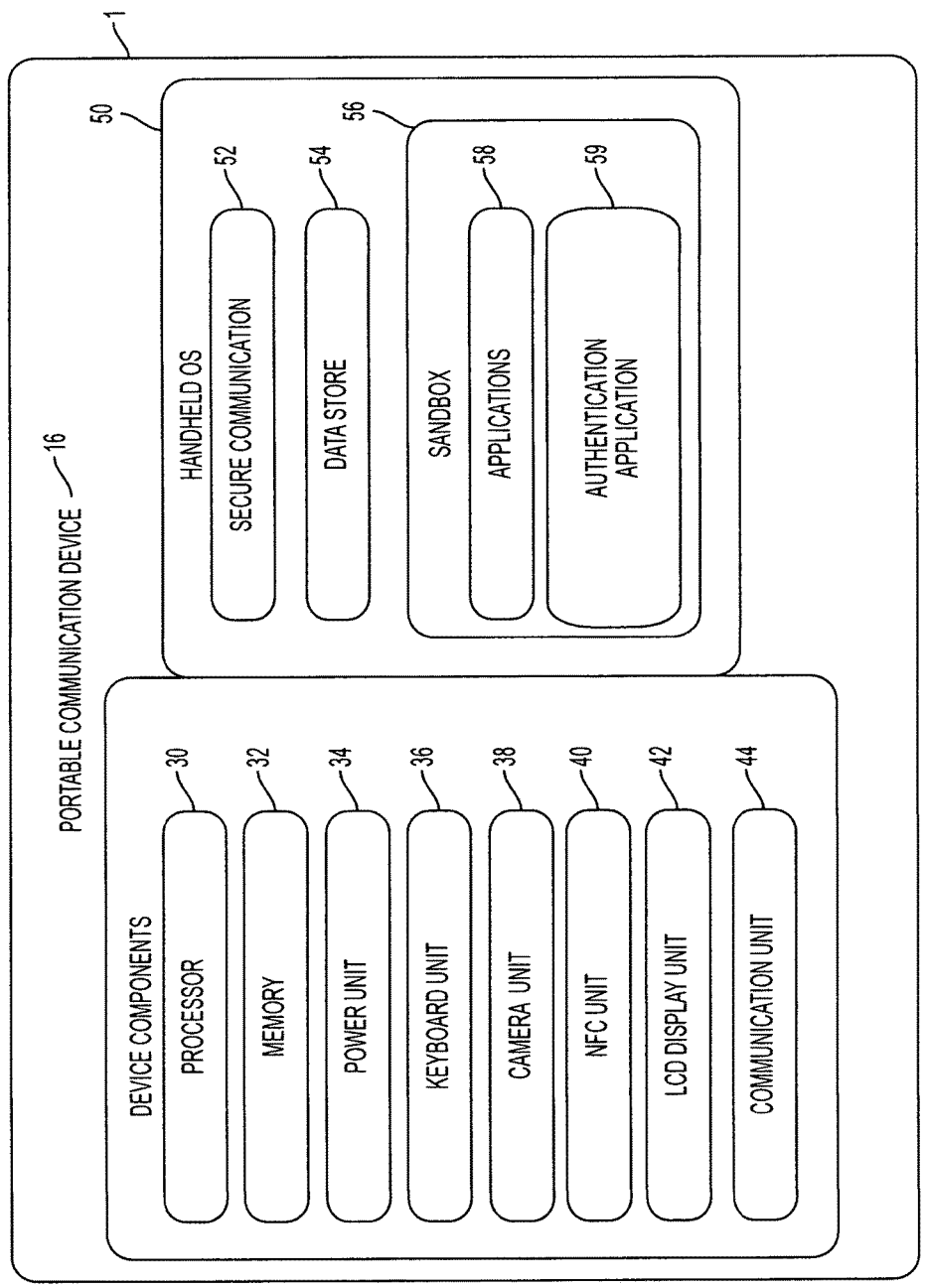
FIG. 2 is a schematic block diagram of an embodiment of a handheld portable communication device.

FIG. 2 illustrates the components of an embodiment of a portable communication device 16 according to the invention, such as a handheld device like a mobile phone or an iPad. The portable communications device can include various components, including a processor 30, memory 32, power unit 34, keyboard 36, camera 38, a near field communication ("NFC") unit 40, LCD Display 42 and a communications unit 44. The device also has an operating system 50 which includes programming for the processes utilized by the device, including programming for secure communication 52, a data storage 54 as well as a sandbox 56, containing an authentication application 58 and other supplemental applications 59 to supplement the processes of the authentication application 58. The sandbox provides a security mechanism for separating running programs and thereby enhances the security of a device according to the invention. Incorporation of an NFC unit 40 in a device according to the invention facilitates use of a device according to the invention by a user in a manner which can make the underlying processes appear seamless. It can be appreciated by a person of ordinary skill in the art to use known processes for the device including processes for providing secure communication 50 by the device 16 to provide for secure receipt and transmission of information. Other applications 59 include software (and there may be hardware capabilities/applications/libraries on the phone) that provide capabilities like picture taking and touch sensitive activity detection.

Figure 3:
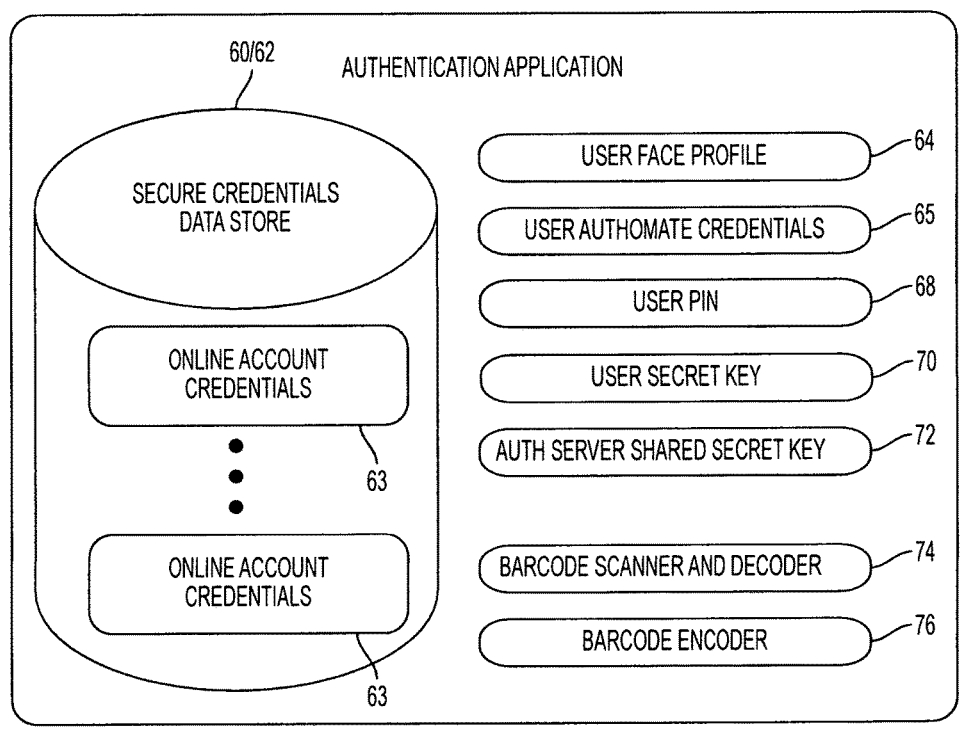
FIG. 3 is a schematic block diagram of embodiment of an authentication application that may reside in the handheld portable communication device described in FIG. 2.

FIG. 3 illustrates an embodiment of an authentication application having processes that may reside in the handheld portable communication device described in FIG. 2. It can be appreciated by a person of ordinary skill in the art that various programming can be provided to effect the processes of a device 16 according to the invention. The processes can be programmed into one or more separately discrete units. Among other things, a secure data storage 60 process can be provided to effect secure storage and retrieval of information from memory 32 on the device 16. Among other things, the secure data storage 62 and credentials 63 can include one or more shared secret keys associated with one or more client processing applications 14. In addition, a user face profile 64 can be provided for a face profile for use with the processes performed by the device 16. The authentication application 14 can also include separate processes for managing and storing other information, such as user credentials 66, a user pin 68, user secret key 70, and an authentication server shared secret key 72 which can be stored in the secure data storage 62 or in other portions of the memory 62. Furthermore, the device 16 includes processes for a barcode scanner and decoder 74 and a barcode encoder 76, which processes can be provided separately or as part of the authentication application 58 process software. The components and arrangements of FIGS. 2 and 3 may be varied within the principles of the present application.

Figure 4:
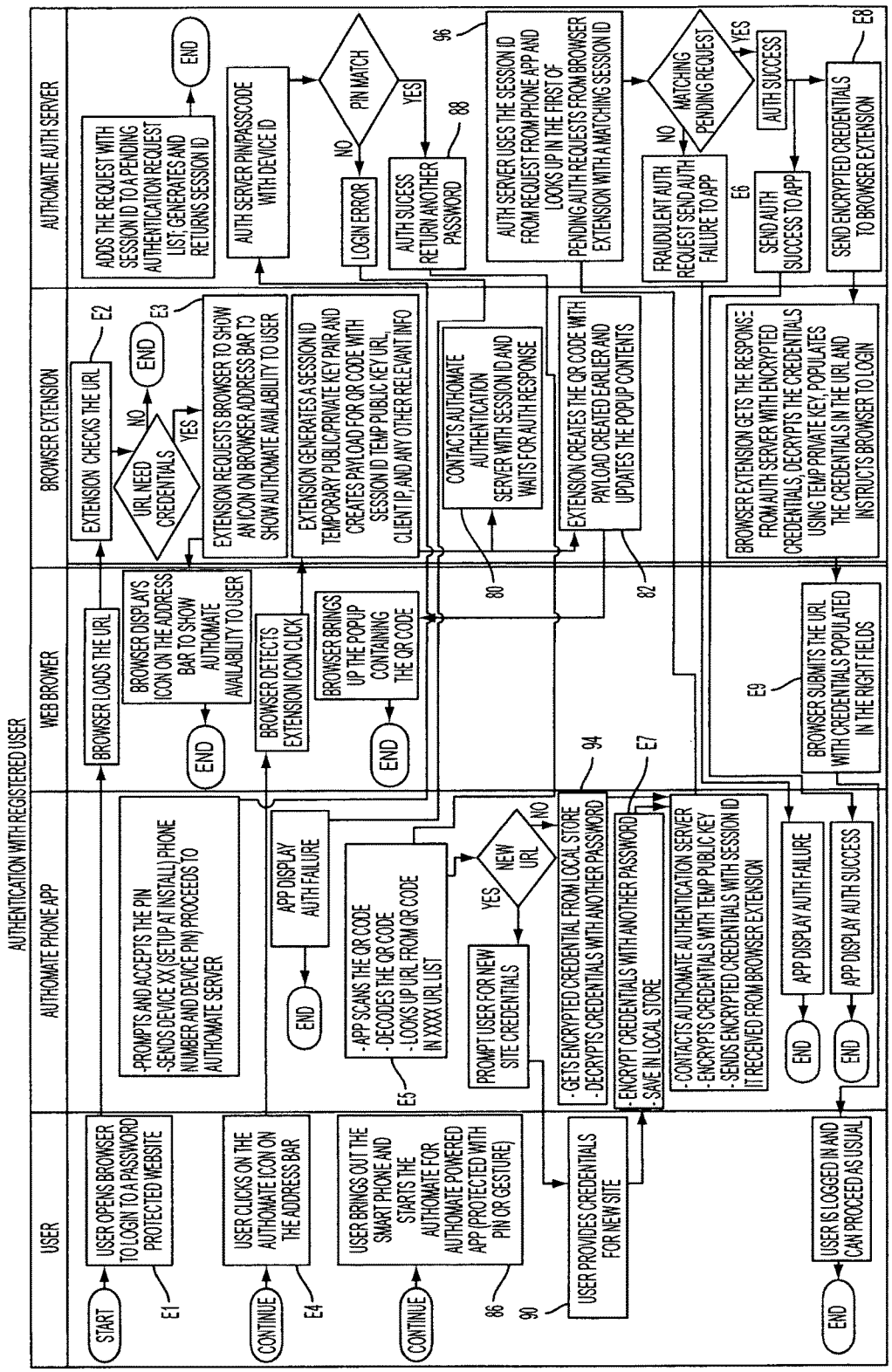
FIG. 4 is a sequence diagram describing the authentication flow based on an embodiment of a method and/or process based on the invention.

Referring to FIGS. 1 and 4, client user starts E1 a client processing application 14 with laptop or PC, which can be automatically started once a user desires to login to an associated online account or portal. For example, the user can open a browser to log in to a password-protected website. Thereafter, the browser can load the URL.

The client processing 14 checks the URL E2 to determine whether or not the associated website requires credentials. The client processing 14 can do this by checking a secure database. If the website requires credentials, the client processing extension can request the browser to show an icon on the browser address bar to show availability of the instant invention to provide secure connection and the needed credentials. In this embodiment, the browser displays the icon, and if the user clicks on the icon the browser detects the extension icon selection to proceed and the browser extension and/or client processing 14 generates a session ID, a temporary public/private key pair and creates a payload for a QR Code with the session ID, temporary public key URL, client IP, and any other relevant information. Thereafter, the browser client processing 14 contacts E2 the authorization server 12 to start a new authorization session and the server generates a session ID 80 to send E3 to the client processing application. The client processing application 14 creates 82 a multi-dimensional barcode with dynamic encryption keys, portal information, session ID and a unique key and displays the barcode in a popup. The client processing application waits for notification.

Further, or in the alternative, the client extension processing 14 can create the QR code with the payload created earlier and updates the pop-up contents. Thereafter the browser can bring up a pop-up containing a QR code for the user to scan.

In addition to or in the alternative, the client processing application 14 and/or browser extension contacts the authentication server with the session ID, and the authentication server can add the session ID to a list of pending authentication requests.

In addition, or as an alternate, the client processing application 14 creates an RSA key and embeds public key in bar code along with portal information, and displays barcode on laptop or PC screen.

User starts authentication 86 by using a smart phone or other device and starting the authentication application 59, or automate power application and entering E4 PIN or gesture on handheld device 16 to access the application. The alternate phone application prompts and accepts the PIN and then sends the device ID (which can be set up upon initialization of services), phone number and device ID/passcode to the authentication server 12.

Authentication server 12 receives the PIN/passcode with the device ID and checks against a secure database for a match for the device to login to the authentication server. If the match is successful, the authentication server returns notification and/or a password to the handheld device application 59 indicating success, and accordingly completes a process which validates the PIN and can, alternatively, or in addition, display one or more scan options 88.

User holds 90 handheld device to laptop or PC login screen and clicks scan option E5. Device scans barcode and validates the client processing application 92. On notification E6, the handheld device 16 finds 94 the encrypted user credentials with encryption key from barcode and sends E7 the encrypted credentials and session ID to authentication server 12. Authentication server 12 checks 96 in provisioned user database, validates session, and sends E8 encrypted payload to waiting client processing application 14. The client processing application decrypts 98 payload using the keys it generated and extracts the credentials. The client processing application 14 then uses the decrypted credentials to provide access to login to the online account and/or web portal and proceed to use those services of the online account.

Handheld device 16 displays result received E9 from the authentication server.

The out-of-band outbound mechanism provides an additional level of security due to the original request being different than the outgoing push from the portable device to the service provider server.

The usability issue is addressed by utilizing the scanning functionality of the hand held device. This eliminates erroneous typing and user frustration.

Figure 5:
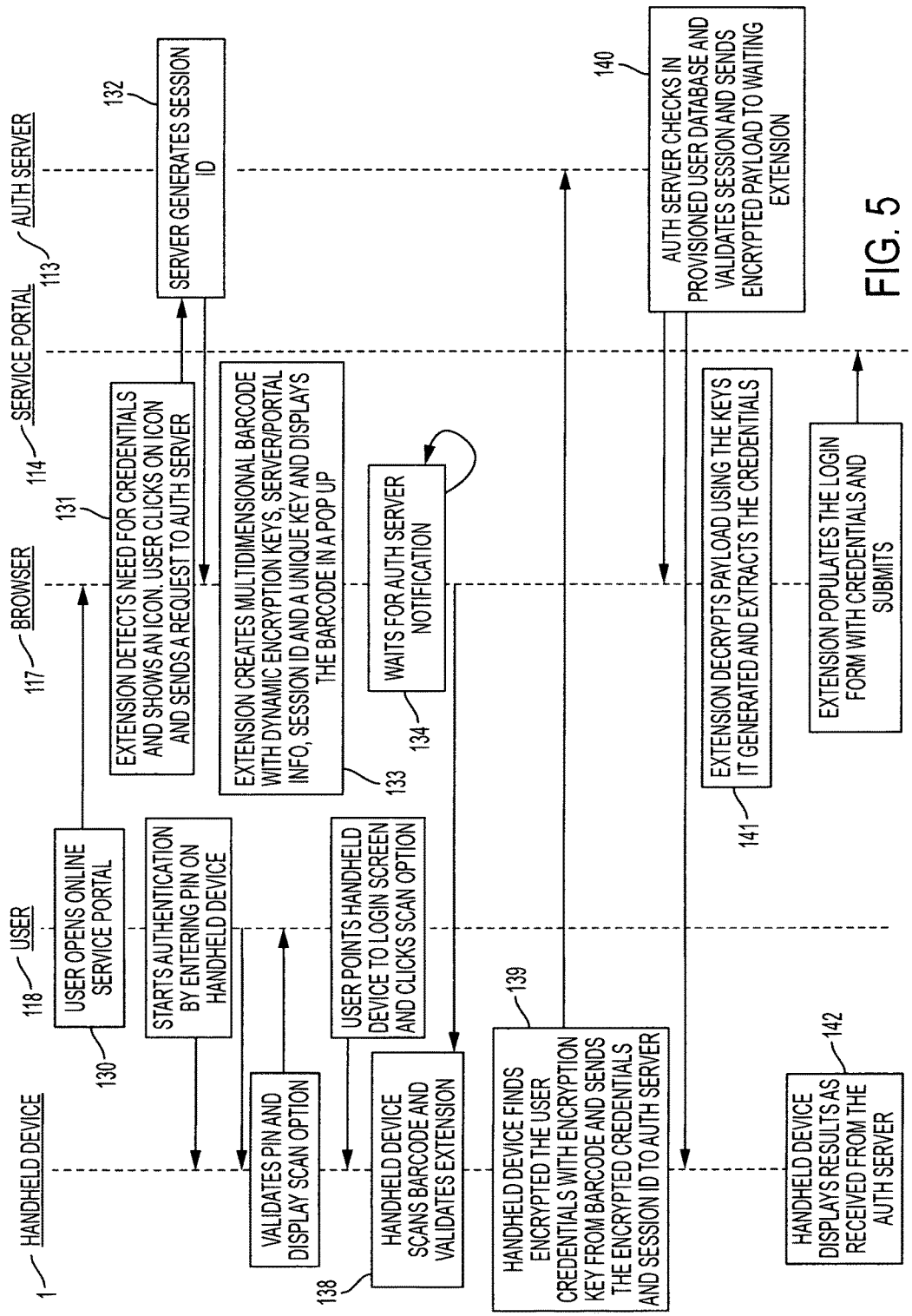
FIG. 5 is a sequence diagram describing the authentication flow based on an embodiment of a method and/or process based on the invention.

FIG. 5 shows a high level, less detailed and alternative embodiment of a method according to the invention shown in FIG. 4. A further embodiment, includes one or more variation of the methods and steps described above, and can include one or more of the following.

A method for authentication typically resides in a system comprising a user, a browser extension or plugin, a portable communications device, and an authentication server having a provisioned user database and encrypted payload.

The method can begin by detecting user intent to login to an online portal (like, gmail, yahoo, ebay, etc) using a browser, and then establishing contact between browser extension or plugin and authentication server wherein a new authentication session is started.

Thereafter, a session ID can be generated at the authentication server, wherein the session ID is communicated to the browser plugin through at least a first communications channel.

A multi-dimensional barcode can be created at the browser extension or plugin, wherein the barcode has dynamic encryption keys, portal information, session ID, and a unique key, and wherein the barcode is displayed in the browser.

In one embodiment, the browser can be held in a waiting state pending authentication server notification of session validation, whereupon once positive notification is received the user starts the authentication by entering credentials on the portable communications device, wherein the portable communications device validates the credentials and displays one or more scan options.

In one embodiment, a portable communications device can be used to scan barcode displayed at login screen and validate browser extension or plugin. However other techniques of coded transmission including, but not limited to NFC, RFID, and Bluetooth, can be used within the scope of the invention.

Once the encrypted user credentials are located on the portable communications device with encryption key from barcode (or an alternative technique of transmission), the encrypted credentials are sent with the session ID from the portable communications device to authentication server via an outbound out-of-band communications channel.

Then, a matching of information is checked in the provisioned user database of authentication server, and the session is validated. Once validated, the encrypted payload is sent to the waiting browser extension or plugin, and validation result can be sent from the authentication server to the portable communication device where the result can be displayed.

The payload can be decrypted at the browser extension or plugin using encryption keys; and credentials can be extracted and decrypted at the browser extension as well.

Using decrypted credentials the login form on the login page of the online portal in the browser can be populated or transmitted directly to initiate and/or complete the login requirements of the online portal, such as by sending the login form to the online portal using the browser extension or plugin.

Similarly, as shown in FIGS. 4 and 5, a method according to the invention can include a number of steps. One possible variation of a method according to the invention is set forth as follows. A user 118 interacts 130 with a client processing application 117.

The client processing application 117 contacts 131 and authorization server 113 to start a new session. The authorization server 113 starts a new session and generates 132 a session ID.

The authorization server 113 communicates with the secure client processing 117 and provides information, including among other things, session ID information.

The client processing application 117 creates 133 a multi-dimensional barcode with barcode information, including dynamic encryption keys, server/portal information, session ID and a unique key. The client processing application can display the generated barcode.

The client processing application waits 134 for receipt of a notification from the authorization server to proceed.

The barcode that has been generated by the client processing application 117 is displayed by the application. The user 118 can scan the barcode with the handheld device 1. The handheld device scans the barcode and validates 138 the service server.

The handheld device finds 139 the encrypted user credentials with encryption key from the barcode and sends validation information including the encrypted credentials and the session ID to the authentication server.

The authorization server receives the validation information, including the encrypted credentials and the session ID and checks 140 the provisioned user database and validates and sends encrypted payload to the waiting client processing application as notification.

The client processing application 117 decrypts 141 the payload from the authorization server using the keys it generated and extracts the credentials. The client processing application then uses the decrypted credentials to provide access to the login portal of the online account or service.

Accordingly, the handheld device can also display and/or access 142 the online account or service. In addition, the handheld device then displays 142 the results which it receives from the authorization server.

Figure 7:
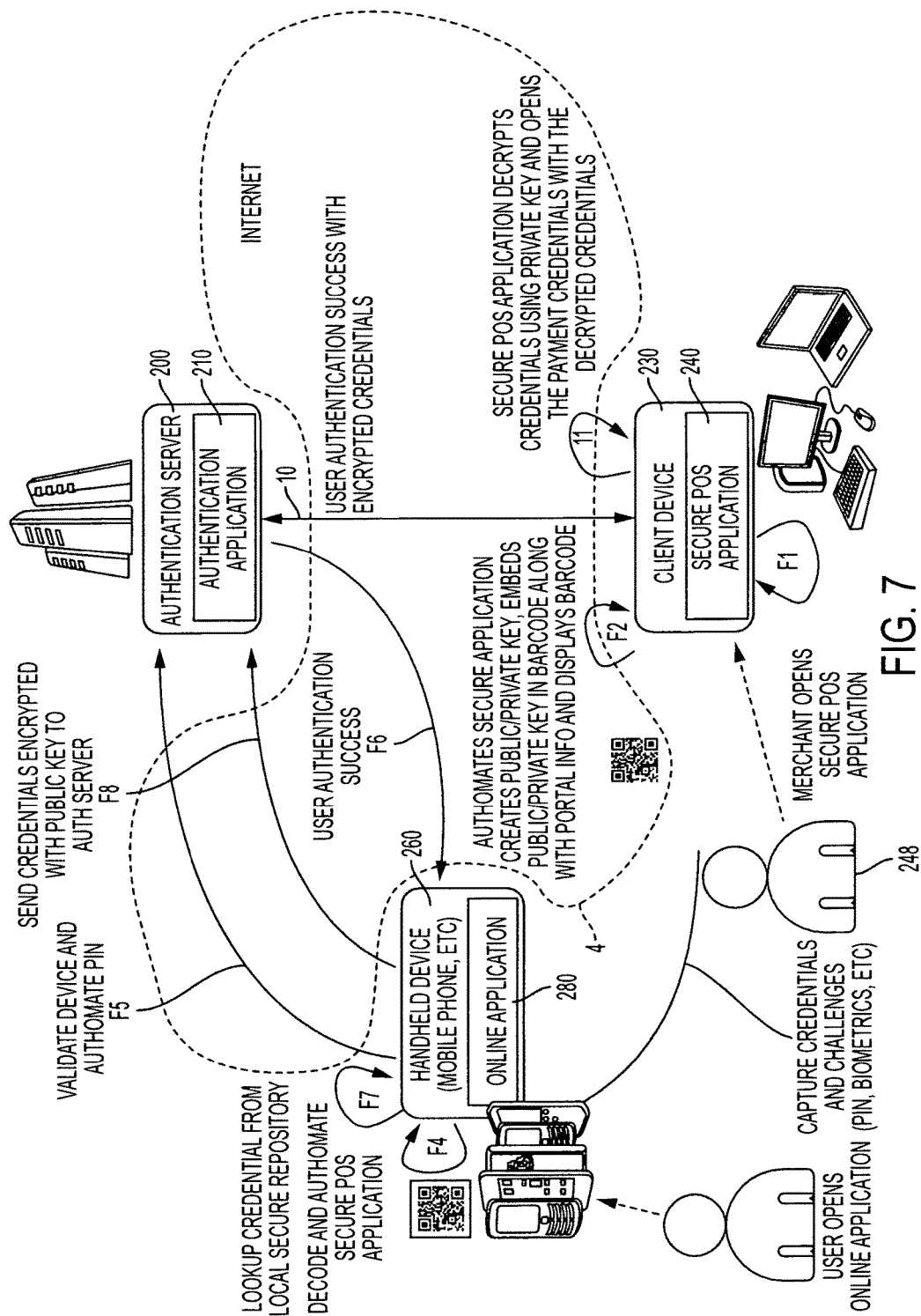
FIG. 7 is a block diagram showing various components of an embodiment of a system according to the invention and depicting an example of an out-of-band outbound multi-channel authentication process specifically adapted to protect payment credentials in accordance with the invention.

Referring to the drawing, FIG. 7 illustrates an embodiment of a system and process according to the invention. In particular, FIG. 7 shows an authentication system that utilizes an out-of-band outbound multi-channel authentication system to protect payment credentials using a client/server system comprising an authentication server 200 having a server application 210, a client system 230, a secure POS application 240 or plugin which decrypts credentials and can use a private key to access the payment credentials with the decrypted credentials, and a portable communications device 260 with an online authentication application 280 which are connected, at least intermittently, via a communications network.

As used herein, "payment credentials" the several embodiments include credit card credentials and debit card credentials, among other things. Accordingly, the several of the embodiments of the authentication system herein are described as specifically adapted for one or more such elements, and a person of ordinary skill in the art can adapt such embodiments for use with other forms of payment methods.

In this particular embodiment of the invention, the process illustrated in FIG. 7 begins with the merchant 248 opening the secure POS application F1. The secure POS application creates F2 a dynamic encryption key.

In one embodiment of the invention, a dynamic encryption key includes a public and private key pair used for securing the user credentials and is uniquely created for each session of authentication generated. The public key encrypts the credentials. The credentials are then decrypted at the client application using the matching private key. Once the authentication session is completed, the public and private key pair are discarded.

In a further embodiment according to the invention, a transitory key can be used in the alternative, or in addition to the creation of a barcode, and then use coded transmission as mentioned above. Accordingly, a secure POS application embeds a public key in the transitory key along with payment credential identifying information and publishes the transitory key. The user then opens the online application on the handheld or other device. The authentication server, with the authentication server application, authenticates F6 the consumer and validates the session by checking in the provisioned user database. The client device 230 captures F3 the credentials request.

The handheld device 260 with the online application 280 looks up F7 the credentials from a local secure repository and decodes F4 the credentials for the secure POS application. The credentials are transmitted to the secure POS application directly or via the authentication application 210 at the same time the secure POS application receives the published transitory key. As the user authentication is a success 10, the secure POS application decrypts 11 the credentials using a private key and allows access to the payment credentials.

More specifically, in one embodiment of the invention, a transitory key includes a barcode or electronic signal comprised of at least one selected from the group of a dynamic encryption key, portal information, session ID, and a unique key.

In addition, or in the alternative, the transitory key may include a passcode, a Time-based One-Time Password Algorithm (TOTP), a location based key, and a device based key. It can be appreciated by a person of ordinary skill in the art that other credential identifying information can be included in the transitory key without departing from the scope of the invention so long as the other important encryption key and unique key are also included.

In one embodiment of the invention, publishing the transitory key includes transmitting the barcode or electronic signal and displaying at least one authentication option to publish the transitory key at the login screen.

In addition, or in the alternative, transmitting the barcode or electronic signal include, but are not limited to at least one mode of communication by NFC, RFID, WiFi, and Bluetooth, all of which can be used within the scope of the invention.

In addition, or in the alternative, an authentication option includes, but is not limited to a scan option, an option to take a photo, an option to receive a photo, and an option to enter a passcode. It can be appreciated by a person of ordinary skill in the art that other authentication options can be included in the scope of the invention.

The secure payment application 240 and the authentication server achieve mutual secure connection, such as a connection based on SSL. The handheld device 260 is also connected to the network and can connect to the authentication server in a secure manner, such as by using SSL. It can be appreciated by a person of ordinary skill in the art that other methods of establishing a secure connection can be used without departing from the scope of the invention.

Figure 8:
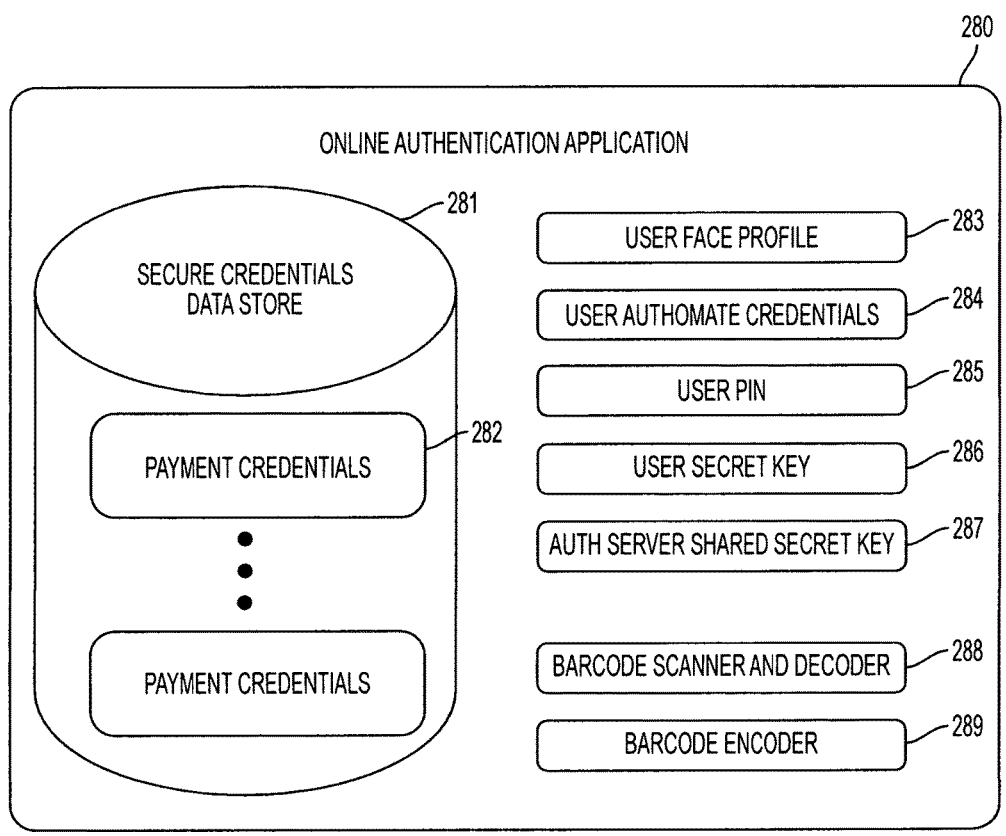
FIG. 8 is a schematic block diagram of embodiment of an online authentication application in accordance with the invention that may reside in a handheld portable communication device such as described in FIG. 2.

FIG. 8 illustrates an embodiment of an online authentication application 280 specifically adapted for secure payment credentials authentication and having processes that may reside in a handheld portable communication device 130 such as described in FIG. 2. The online authentication application 280 includes a secure credentials data store 281 that can store payment credentials 282, user face profile 283, user Authomate account credentials 284, user PIN 285, user secret key 286, authentication server shared secret key 287, barcode scanner and decoder 288, and a barcode encoder 289. It can be appreciated by a person of ordinary skill in the art that various programming can be provided to effect the processes of a device 290 according to the invention. The processes can be programmed into one or more separately discrete units.

A secure data credential data store 281 can be provided to effect secure storage and retrieval of information from memory on the device, including payment credentials 282. The secure data storage 281 and payment credentials 282 can include one or more shared secret keys associated with one or more secure POS applications 240.

In addition, a user face profile 283 can be provided for a face profile for use with the processes performed by the device. The online application 280 can also include separate processes for managing and storing other information, such as user credentials 284, a user pin 285, user secret key 286, and an authentication server shared secret key 287, which can be stored in the secure credentials data storage 281 or in other portions of the memory 30. Furthermore, the device can include processes for a barcode scanner and decoder 288 and a barcode encoder 289, which processes can be provided separately or as part of the online application 280 process software. The components and arrangements of FIGS. 2 and 8 may be varied within the principles of the present application.

One embodiment of user credentials according to the invention include, but are not limited to names, passwords, date of birth, name of first pet, social security number, mother's maiden name, among other non-public information.

It can be appreciated by a person of ordinary skill in the art that other user credentials can be used without departing from the scope of the invention.

Figure 9:
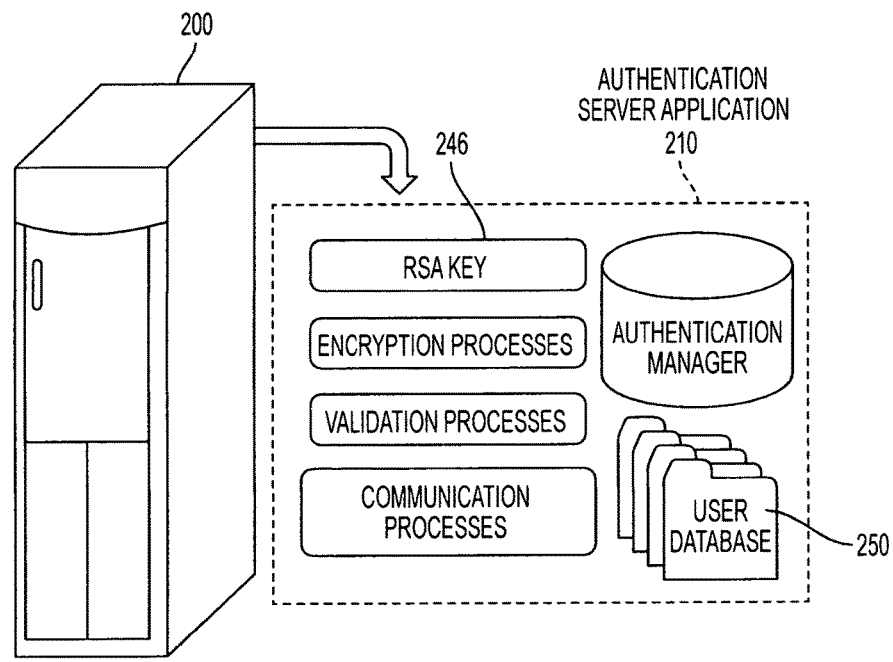
FIG. 9 is a block diagram depicting an embodiment of an authentication server.

FIG. 9 illustrates an embodiment of the authentication server 200 comprising of an authentication server application 210. The authentication server application comprises of a user database 250, authentication manager, encryption, validation, and communication processes, and a RSA Key 246. The authentication server can be adapted to begin a new authentication system and generate a session ID. The authentication server can also be adapted to receive encrypted credentials, process the encrypted credentials, and send an encrypted payload to the secure POS application. The authentication server can also be adapted to transmit and/or store encrypted credential between instances of the online application 280 for purposes of credential distribution and control. It can be appreciated by a person of ordinary skill in the art that the server can be provided as a general purpose computer or designed with the use of Application Specific Integrated Circuits (ASICS).

The user database 250 can be adapted to store previous user information, current user information, previous user interaction with the authentication server 200, unencrypted and encrypted credentials, public and private keys, device ID, Session ID, PIN, device RSA key 246, current user interaction with the authentication server 200, among other things. The Authentication server application includes processes for encryption, validation, and communication allowing the server 200 to validate a new session with an incoming validation request. The authentication server application also includes processes for managing the distribution of credentials between instances of the online application 280 and managing and enforcing user permissions for those credentials, as well as tracking the use of those credentials. The components and arrangements of FIG. 9 may be varied within the authentication server.

Figure 10:
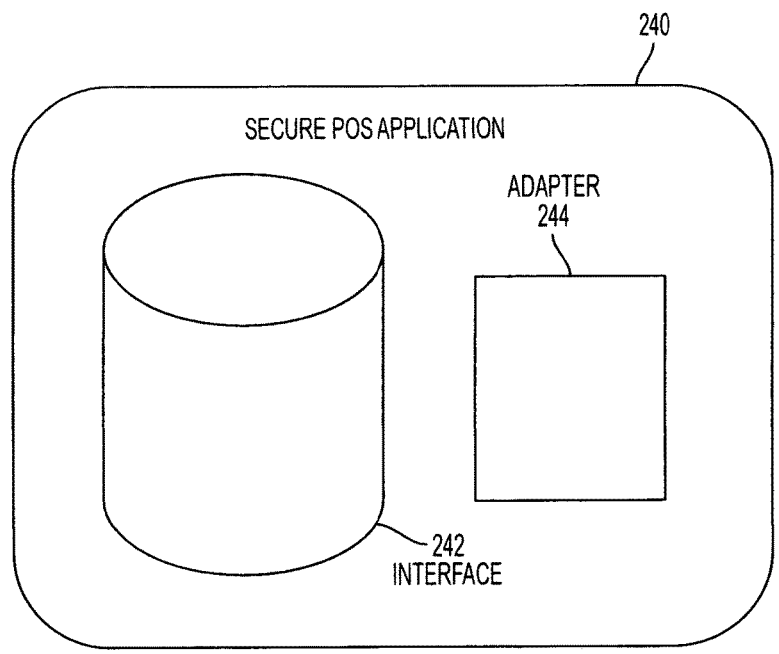
FIG. 10 is a schematic block diagram of an embodiment of a secure POS application.

FIG. 10 illustrates an embodiment of a secure POS application, i.e., client payment application 240 comprising of an interface 242, such as the Multi-dimensional QR Code, Bluetooth, NFC, or Computer generated Sound, which can be adapted for various types of devices, such as a POS terminal, handheld communication device or a desktop computer; and an adapter 244 that can also be embedded in other applications to adapt to various types of payment methods, such as credit and debit cards.

The interface 242 allows the user to interact with the client payment application 240 to begin the process of authenticating payment credentials or payload. The interface is also adapted to allow the user to interact with the authentication server 200 and online application 280 during the authentication process, as well as provide use of the payment credentials adapter 244. A typical embodiment might be a software library including components such as a QR code generator and public/private key encryption. It can be appreciated by a person of the ordinary skill in the art that the interface can be provided by different operating systems and interact with other processes within the secure POS application 240.

The payment credentials adapter 244 is provided within the secure POS application 240 as additional programming to permit a user to access various types of payment credentials encrypted by the system. Accordingly, it can be appreciated by a person of ordinary skill in the art that such software can be pre-installed or installed upon use.

For example, one embodiment of an adapter according to the invention is an adapter to access payment credentials from a credit card with a chip that has been decrypted by the secure POS application 240.

In addition, or in the alternative, an embodiment of the adapter according to the invention includes an adapter to access payment credentials from a credit card without a chip or from a debit card that has been decrypted by the secure POS application.

Figure 11:
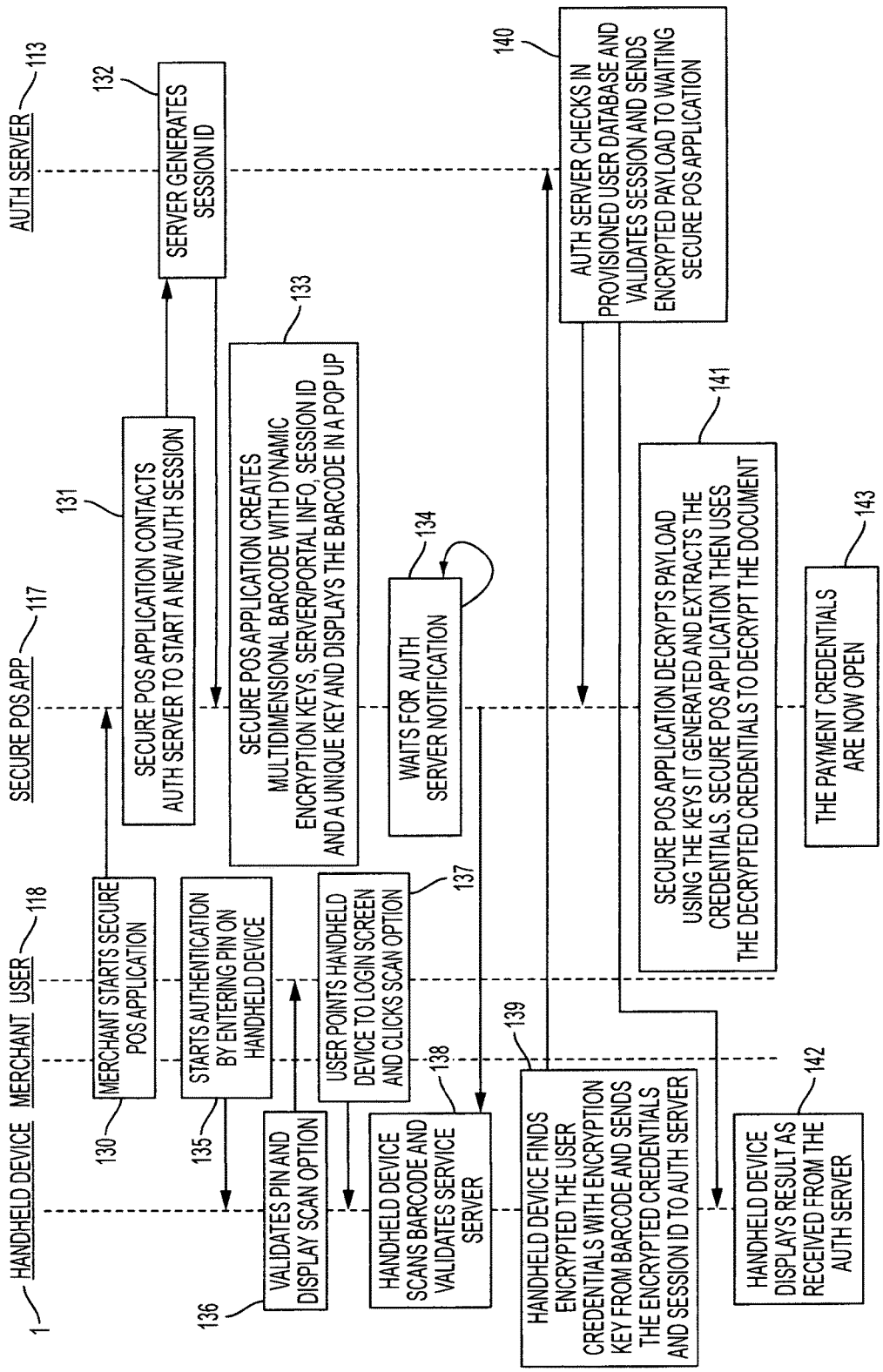
FIG. 11 is a sequence diagram describing an authentication flow based on an embodiment of a method and/or process based in accordance with the invention.

FIG. 11 shows an embodiment of a method according to the invention. A method for authentication can be provided with programming in a system comprising a merchant, a user, client device, such as a browser extension or plugin having a secure POS application, a portable communications device having an online application, and an authentication server and authentication server application having a provisioned user database and encrypted payload.

The method includes a plurality of steps, and can begin by the merchant starting 130 the secure POS application by activating the secure POS application on a client device, such as a POS terminal, and accessing a payment method that requires credentials for access. The secure POS application detects the need for credentials and contacts 131 the authentication server application to start a new authentication session for the merchant to begin accessing the payment credentials. Thereafter, the authentication server application generates 132 a session ID for the merchant whereby such session ID will be used through the process to track and ensure proper decryption and authentication. This session ID is transmitted back to the secure POS application.

The secure POS application 240 creates 133 a multi-dimensional transitory key 10 wherein the transitory key includes at least one dynamic encryption key, server/portal information, a session ID, and a unique key. The multi-dimensional transitory key can be published 133 in a separate popup or window.

In one embodiment of the invention, a dynamic encryption key includes a public and private key pair used for securing the user credentials that is uniquely created for each session of authentication generated. The public key encrypts the credentials. The credentials are then decrypted at the client application using the matching private key. Once the authentication session is completed, the public and private key pair can be discarded.

In one embodiment of the invention, a transitory key includes a barcode or electronic signal comprised of at least one selected from the group of a dynamic encryption key, portal information, session ID, and a unique key.

In addition, or in the alternative, the transitory key may include a passcode, a Time-based One-Time Password Algorithm (TOTP), a location based key, and a device based key. It can be appreciated by a person of ordinary skill in the art that other credential identifying information can be included in the transitory key without departing from the scope of the invention.

In one embodiment of the invention, publishing the transitory key includes transmitting the barcode or electronic signal and displaying at least one authentication option to publish the transitory key at the login screen.

In addition, or in the alternative, transmitting the barcode or electronic signal include, but are not limited to at least one mode of communication by NFC, RFID, WiFi, and Bluetooth, all of which can be used within the scope of the invention.

In addition, or in the alternative, an authentication option includes, but is not limited to a scan option, an option to take a photo, an option to receive a photo, and an option to enter a passcode. It can be appreciated by a person of ordinary skill in the art that other authentication options can be used without departing from the scope of the invention.

Further to an embodiment of the invention as shown in FIG. 11, the user starts 129 the online application on the handheld device and can enable the online application device 260 to cause the device to scan 137 the barcode displayed.

The secure POS application is put on hold 134 as it waits for a notification from the authentication server that the session started 130 has been completed and the relevant credentials provided by the online application 135-130.

The user then starts authentication 135 by entering a PIN on the handheld device 260. The online authentication application 280 on the handheld device then validates 136 the PIN and displays a scan option. The user points 137 the handheld device to the barcode generated by the secure POS application, clicking the scan option on the handheld device. The user scans the barcode 138 thereby acquiring the credentials request from the secure POS application.

The online application or the handheld device finds 139 the encrypted user credentials with the encryption key from the barcode and sends 139 the encrypted credentials and session ID to the authentication server and the authentication server application.

The authentication server checks 140 in the provisioned user database 250, validates the session, and sends the encrypted payload to the waiting secure POS application.

After validation, the device displays 142 the result as received from the authentication server. The secure POS application decrypts and extracts 141 the credentials from the payload received from the authentication server. The secure POS application uses 141 the decrypted credentials to decrypt the payment credentials or payload. The encrypted payment credentials are now accessible 143.

Figure 12:
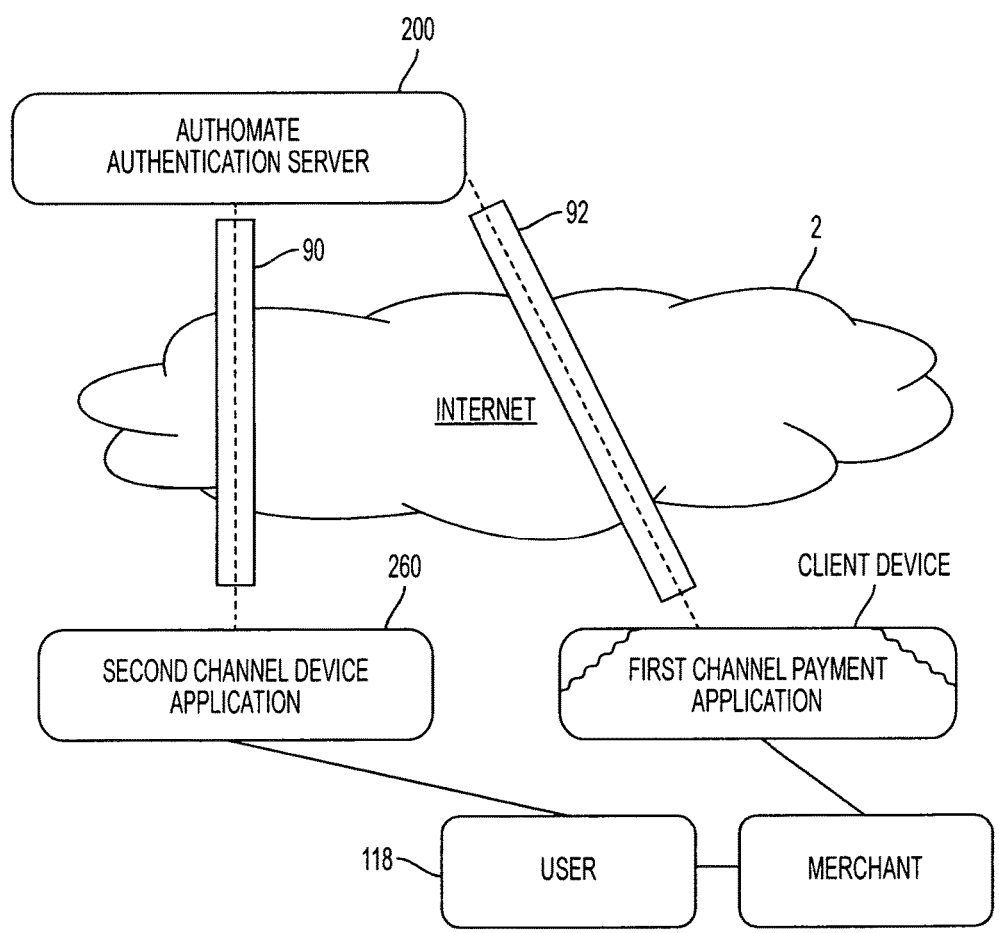
FIG. 12 is a block diagram illustrating one example of two separate communication channels in an embodiment of the present invention.

FIG. 12 provides an illustration of the separate communication channels in an embodiment of the present invention that can be used for an authentication process. The online application of the handheld device 260 communicates with the authentication server over a first communications channel 90. This channel is separate from a second communications channel 92, over which the secure POS application 240 and authentication server 200 communicate. It is contemplated in the art that the invention includes other configurations.

For example, communication channels can be different types of communication channels, including systems typically digital, such as phone, internet, and wifi, but also some forms of analog communications. In addition, the applications described herein can communicate through different devices, such as POS terminals to mobile phones, mobile phone to mobile phone, mobile phone to computer, computer to laptop, or mobile phone to tablet, among other things.

Specifically, in one further embodiment of a system and process according to the invention, at least the out-bound portions of communications from the handheld device 260 to the authentication server 200 are provided in a separate communications channel 90 and are out-of-band from the communication channel 92 over which the authentication server 200 and secure POS application 240 communicate.

In another embodiment of a system and process according to the invention, at least the out-bound communications channel 90 from the second channel device application 280 to the authentication server are provided in a separate communications channel and are out-of-band from the communication channel 92 over which the authentication server and first channel payment application 240 communicate.

Furthermore, another embodiment of a system and process according to the invention, at least the out-bound communications channel from the first channel payment application 240 to the authentication server are provided in a separate communications channel 90 and are out-of-band from the communication channel 92 over which the authentication server and second channel device application 280 communicate.

Figure 13:
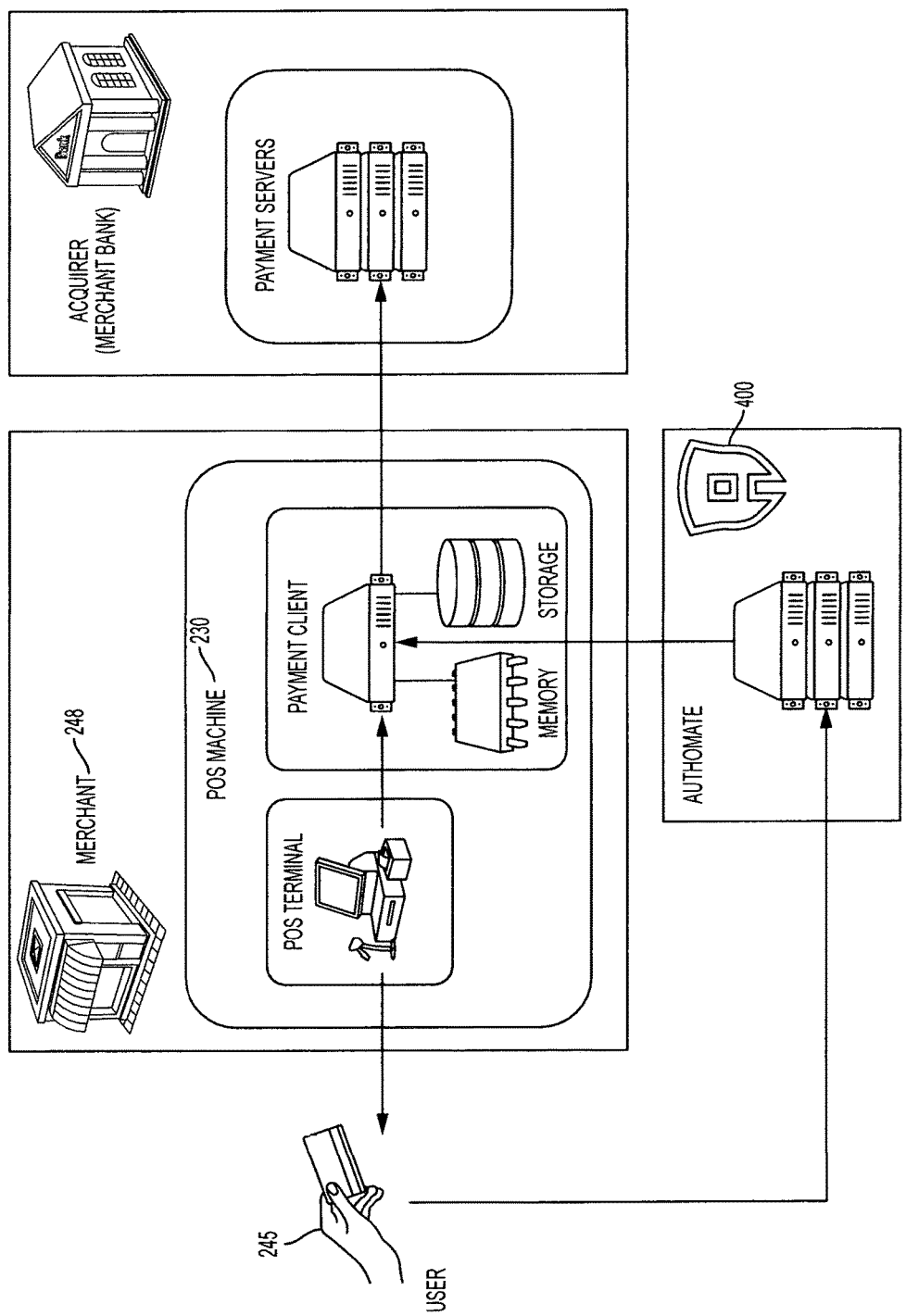
FIG. 13 is a block diagram showing an embodiment of a system and process according to the invention depicting the placement of the invention.

FIG. 13 provides an illustration of an embodiment of a system and process that utilizes the invention. The process, as a whole, includes an embodiment of the Authomate system 400 programmed in the payment client within the POS Terminal, which represents the POS Machine 230. This embodiment of the process according to the invention encrypts the payment credentials and prevents the POS terminal from gaining access to the user's payment data.

Another embodiment of the system and process that includes the Authomate system according to the invention is a process implemented to bypass the POS terminal by processing the payment credentials directly into the Authomate system from which the encrypted payment credentials are then sent from the Authomate system to the Payment Servers at the Merchant Bank.

Various changes may be made to the system and process embodying the principles of the invention. The foregoing embodiments are set forth in an illustrative and not in a limiting sense. The scope of the invention is defined by the claims appended hereto.

We claim:

1. A method for authentication for accessing payment credentials in a system comprising a merchant, a user, a first channel payment application, a second channel device application, and an authentication server application having a provisioned user database and encrypted payload, wherein the method comprises:

providing a login portal for accessing payment credentials by a merchant, said login portal being in communication with said first channel payment application;

establishing contact between the first channel payment application and the authentication server application wherein a new authentication session is started;

generating a session identification ("ID") at the authentication server application, wherein the session ID is communicated to the first channel payment application through at least a first communications channel;

creating a transitory key at the first channel payment application and providing at least one authentication option for publishing the transitory key at a login screen of the login portal;

starting authentication by entering at least one credential on the second channel portable communications device application, wherein the second channel portable communications device application validates at least one credential and displays at least one authentication option;

using the second channel portable communications device application to receive a published transitory key and validate the first channel payment application;

using the second channel portable communications device application to receive the message from the first channel payment application and to validate the first channel payment application;

finding on the second channel portable communications device application at least one encrypted user credential with an encryption key from the transitory key;

sending the at least one encrypted credential and session ID from the second channel portable communications device application to the authentication server application via an outbound out-of-band communications channel;

validating the new authentication session;

sending an encrypted payload to the first channel payment application;

decrypting the encrypted payload at the first channel payment application using at least one of encryption key from the transitory key; and extracting credentials from the decrypted payload at the first channel payment application.

2. A method according to claim 1 wherein the transitory key created by the first channel payment application is comprised of at least one selected from a group consisting of: a dynamic encryption key, portal information, session ID, passcode, public key, private key, location based key, device based key, and a unique key.

3. A method according to claim 2 wherein the dynamic encryption key includes a public and private key pair, wherein the step of authenticating a user includes the public key encrypting credentials of the user and the private key decrypting credentials at the first channel payment application.

4. A method according to claim 1 wherein a message created at and by the first channel payment application is comprised of at least one selected from a group consisting of: a dynamic encryption key, portal information, session ID, and a unique key from the encrypted payload.

5. A method according to claim 1 further comprising the step of holding the first channel payment application in wait pending notification from the authentication server application of session validation.

6. A method according to claim 1, wherein the step of validating the new authentication session includes the authentication server application checking in the provisioned user database of the authentication server application and sending a validation result to the second channel portable communication device application where the validation result is published.

7. A method according to claim 1 wherein the step of sending the at least one encrypted credentials and session ID from the second channel portable communications device application to the authentication server application via an outbound out-of-band communications channel is performed by the first channel payment application and the login portal.

8. A method according to claim 1, wherein said payment credentials is a payment type selected from a group consisting of: a credit card without a chip, a credit card with a chip, and a debit card.

9. A method according to claim 1 wherein the step of receiving the message from the first channel payment application by the second channel portable communications device application includes at least one mode of communication selected from a group comprising: near field communication, short-wave UHF wireless, radio-frequency, and Computer Generated Sound.

10. A method for authentication in a system comprising a merchant, a user, a secure point of sale (POS) application or plugin, a second channel portable communications device application, and an authentication server having a provisioned user database and an encrypted payload, wherein the method comprises:

detecting merchant intent to access payment credentials;

establishing contact between the secure POS application or plugin and the authentication server wherein a new authentication session is started;

generating a session identification ("ID") at the authentication server, wherein the session ID is communicated to the secure POS application or plugin through at least a first communications channel;

creating a multi-dimensional transitory key at the secure POS application or plugin, wherein the transitory key includes as least one dynamic encryption key, portal information, session ID, and a unique key, and providing an option to transmit the multi-dimensional transitory key;

starting authentication by user entering credentials on the second channel portable communications device application, wherein the second channel portable communications device application validates the credential and provides authentication options;

using the second channel portable communications device application to authenticate the multi-dimensional transitory key and validate the secure POS application or plugin;

finding on the second channel portable communications device application at least one encrypted user credential with an encryption key from the multi-dimensional transitory key;

sending the at least one encrypted user credential and the session ID from the second channel portable communications device application to the authentication server via an outbound out-of-band communications channel;

checking in provisioned user database of the authentication server, wherein the new authentication session is validated;

sending validation result from the authentication server to the second channel portable communications device application where the result is displayed;

extracting and decrypting the at least one user credentials at the secure POS application or plugin;

using at least one decrypted user credentials to access the payment credentials.

11. A system of user authentication for accessing payment credentials in a communications network, the system comprising:

a first channel payment application having programming for communication with a login portal and screen for access by a merchant;

an hardware authentication server device having programming for establishing contact between the first channel payment application and the hardware authentication server device, wherein a new authentication session is started; programming for generating a session identification ("ID"), and programming for communicating a session ID to the first channel payment application through at least a first communications channel;

wherein the first channel payment application includes programming for creating a multi-dimensional transitory key to be published at the login screen;

wherein the first channel payment application includes programming for authentication by receiving at least one user credential from a second channel portable communications device application, a second channel portable communications device application having programming for authentication, including programming for receiving at least one user credential and displaying at least one authentication option; programming for authenticating the multi-dimensional transitory key published at the login screen; programming for validating the first channel payment application; programming for finding at least one encrypted user credential with an encryption key and/or user credential from the multi-dimensional transitory key; and programming for sending the at least one encrypted user credential and session ID to the hardware authentication server device via an outbound out-of-band communications channel;

wherein the hardware authentication server device further includes programming for checking a provisioned user database and validating the session ID; programming for sending an encrypted payload to the first channel payment application; programming for sending validation result to the second channel portable communications device application;

wherein the first channel payment application includes programming for decrypting the encrypted payload at the secure payment application using at least one of the encryption keys from the multi-dimensional transitory key; programming for extracting and decrypting the at least one encrypted user credential; and programming for using at least one decrypted user credential to access at least one payment credential.

12. A system according to claim 11, wherein the multi-dimensional transitory key is comprised of at least one selected from the group consisting of a dynamic encryption key, portal information, session ID, and a unique key.

13. A system according to claim 12, wherein the first channel payment application further includes programming to use a private key embedded in the dynamic encryption key to decrypt at least one user credential encrypted with a public key at the second channel portable communications device application.

14. A system according to claim 11 wherein the first channel payment application further includes programming to create a message, wherein the message is comprised of at least one selected from a group consisting of: a dynamic encryption key, portal information, session ID, and a unique key from the encrypted payload.

15. A system according to claim 11 wherein the first channel payment application includes programming for the first channel payment application to be held in wait pending notification from the hardware authentication server device of session validation.

16. A system according to claim 11 wherein the hardware authentication server device further includes programming to validate the new authentication session by checking in the provisioned user database and sending the validation result to the second channel portable communication device application where the validation result is published.

17. A system according to claim 11 wherein the hardware authentication server device further includes programming for receiving the at least one user credentials and session ID via an outbound out-of-band communications channel from the first channel payment application.

18. A system according to claim 11 wherein the at least one payment credential is a payment method selected from a group consisting of: a credit card with a chip, a credit card without a chip, and a debit card.

19. A system according to claim 11 wherein the second channel portable communications device application further includes programming for receiving messages from the first channel payment application from at least one mode of communication selected from a group consisting of: near field communication, short-wave UHF wireless, radio-frequency, and Computer Generated Sound.

20. A system of user authentication for accessing payment credentials in a communications network, the system comprising:

a secure payment application having an interface, adapter, and programming for detecting user intent to access an online account and establishing communication between the secure payment application and an hardware authentication server device to start a new authentication session;

wherein the secure payment application includes programming that creates a multi-dimensional transitory key containing dynamic encryption keys, portal information, session identification "ID", and a unique key and said multi-dimensional transitory key is published on an interface; wherein the secure payment application holds the payment credentials in place pending authentication from the authentication server and after the new authentication session is validated; and wherein the secure payment application includes programming to decrypt a payload from the hardware authentication server device and extract at least one user credential and to access the payment credentials using the decrypted user credentials, a second channel portable communications device application having programming for validating the user credentials entered by the user and displaying at least one authentication option for the multi-dimensional transitory key to validate the session; and programming for finding at least one encrypted user credential with an encryption key from the multi-dimensional transitory key and sending the at least one encrypted user credential with the session ID to the hardware authentication server device; and the hardware authentication server device having programming for establishing a connection with the secure payment application wherein the authentication server includes programming that generates a session ID and receives encrypted user credentials from the second channel portable communications device application via an outbound out-of-band communications channel; programming to check in its provisioned user database for the user credentials; and programming for validation of the new authentication session and sending an encrypted payload to the secure payment application.

* * * * *